United States Patent
Oba et al.

(10) Patent No.: US 7,235,936 B2
(45) Date of Patent: Jun. 26, 2007

(54) LINEAR VIBRATION MOTOR

(75) Inventors: Takafumi Oba, Kusatsu (JP); Atsushi Takahashi, Nagaokakyo (JP)

(73) Assignee: Matsushita Electric Works, Ltd., Osaka (JP)

( * ) Notice: Subject to any disclaimer, the term of this patent is extended or adjusted under 35 U.S.C. 154(b) by 68 days.

(21) Appl. No.: 11/106,430

(22) Filed: Apr. 15, 2005

(65) Prior Publication Data

US 2005/0231045 A1 Oct. 20, 2005

(30) Foreign Application Priority Data

Apr. 19, 2004 (JP) .............................. 2004-123260

(51) Int. Cl.
*H02P 1/00* (2006.01)
(52) U.S. Cl. ...................... 318/114; 318/119; 318/599; 318/811; 318/432; 361/152; 361/154
(58) Field of Classification Search ................ 318/560, 318/3, 9, 432, 599, 811, 114, 119; 361/152, 361/154
See application file for complete search history.

(56) References Cited

U.S. PATENT DOCUMENTS

| | | | |
|---|---|---|---|
| 5,264,982 A * | 11/1993 | Cox et al. .................... | 361/144 |
| 5,442,515 A * | 8/1995 | Wallaert ...................... | 361/187 |
| 5,539,608 A * | 7/1996 | Hurley et al. ................ | 361/152 |
| 5,621,603 A * | 4/1997 | Adamec et al. ............. | 361/154 |
| 5,955,799 A | 9/1999 | Amaya et al. | |
| 6,133,701 A * | 10/2000 | Gokturk et al. ............. | 318/114 |
| 6,351,089 B1 | 2/2002 | Ibuki et al. | |
| 2004/0108824 A1 * | 6/2004 | Ueda et al. .................. | 318/114 |

FOREIGN PATENT DOCUMENTS

| | | |
|---|---|---|
| JP | 8-331826 | 12/1996 |
| JP | 2001-016892 | 1/2001 |

OTHER PUBLICATIONS

English Language Abstract of JP 2001-016892, Jan. 19, 2001.
English Language Abstract of JP 8-331826, Dec. 13, 1996.

* cited by examiner

*Primary Examiner*—Rina Duda
(74) *Attorney, Agent, or Firm*—Greenblum & Bernstein, P.L.C.

(57) ABSTRACT

A linear vibration motor comprises: a stator provided with one of a permanent magnet and an electromagnet including a winding; a vibrator provided with the other of the permanent magnet and the electromagnet and supported to be able to vibrate; a movement detection unit for detecting movement of the vibrator; a control output unit for supplying electric power to the winding of the electromagnet based on an output of the movement detection unit so as to generate vibration of the vibrator; a rechargeable battery for supplying electric power to the control output unit; and a power supply unit for supplying electric power to the control output unit and to the rechargeable battery, wherein the power supply unit supplies electric power in an intermittent mode with synchronized timing such that the timing of the intermittent power supply is synchronized with the timing of the power supply to the winding. Thereby, the voltages of the rechargeable battery for left and right outputs to the winding become the same as each other at the timing of supplying electric power to the winding for left and right outputs, preventing amplitude variation caused by difference between the voltages of the rechargeable battery, and thereby preventing amplitude fluctuations and whirring noise.

18 Claims, 10 Drawing Sheets

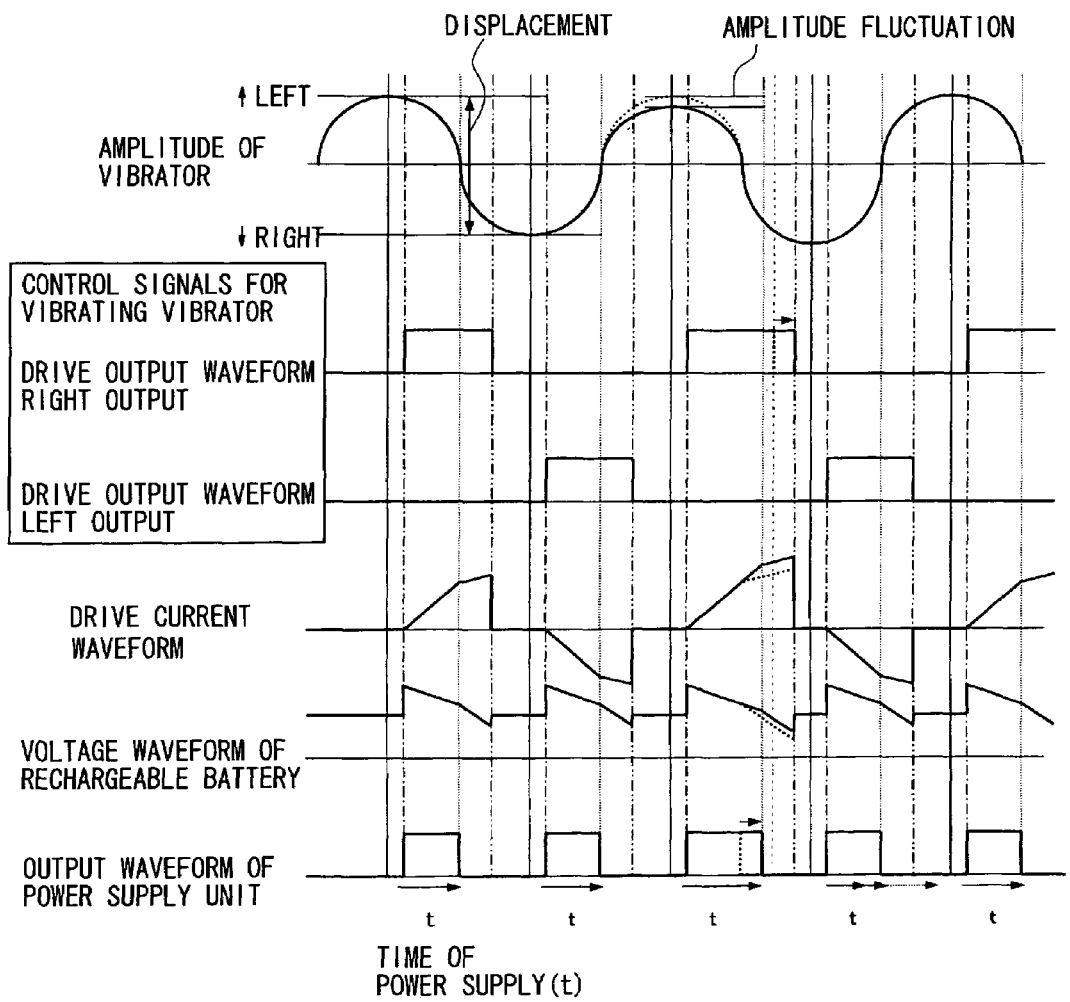

LINEAR VIBRATION MOTOR

BACKGROUND OF THE INVENTION

1. Field of the Invention

The present invention relates to a linear vibration motor for generating reciprocating vibration, and more particularly to a linear vibration motor using a rechargeable battery as a power source.

2. Description of the Related Art

A conventional linear vibration motor, as disclosed in U.S. Pat. No. 6,351,089, which can be used as a drive source for a reciprocating type electric shaver is controlled in operation such that movement (displacement, velocity or acceleration) of a vibrator is detected so as to continuously generate a constant amplitude vibration even with load fluctuations, thereby generating a reciprocating movement with stable amplitude.

FIG. 9 shows a circuit diagram of a conventional linear vibration motor. As shown in FIG. 9, the conventional linear vibration motor comprises: a stator 101 provided with a winding 110; a vibrator 102 provided with a permanent magnet 120; a frame 103 for holding the vibrator 102; springs 104 connected between the frame 103 and the vibrator 102 for suspending the vibrator 102; a control output unit 105 for supplying a drive current to the winding 110; and a movement detection unit 106 for detecting the movement of the vibrator 102 on the basis of the electromotive force generated in the winding 110. Based on the output of the movement detection unit 106, the control output unit 105 controls, by e.g. PWM (pulse width modulation) control, a drive current to be supplied to the winding 110.

On the other hand, such linear vibration motor can also be used as a driving source for an electric hair cutter (hair clipper) which is operated continuously for a relatively long time. However, in the case where the linear vibration motor uses a rechargeable battery as a power supply, a voltage drop of the rechargeable battery is likely to become a problem when it is operated for a long time. In such case, it is desirable that electric power can be supplied to both the rechargeable battery and the linear vibration motor during the operation of the linear vibration motor.

In such linear vibration motor, it may possible to provide with a power supply unit for supplying electric power from an AC power source in addition to the rechargeable battery, in order to make it possible to supply electric power to both the rechargeable battery and the linear vibration motor as described above.

In this case, if the power supply unit is designed assuming a large current to flow therethrough at the time of starting the operation or with heavy loads, the power supply unit is likely to become very large in capacity and size. For this reason, even when the power supply unit is connected, it is often designed to use the power supply of the rechargeable battery as well at the time of starting the operation or with heavy loads, not electrically separating the rechargeable battery.

Now, assuming that the power supply unit supplies electric power to not only the control output unit but also the rechargeable battery during the operation of the linear vibration motor, the following three cases are considered possible with respect to the relation between the load current (average value) of the linear vibration motor and the output current (average value) of the power supply unit:

(i) [Load current of linear vibration motor]<[Output current of power supply unit]
(ii) [Load current of linear vibration motor]=[Output current of power supply unit]
(iii) [Load current of linear vibration motor]>[Output current of power supply unit]

In case (i), the rechargeable battery is charged to increase its voltage. In case (ii), the rechargeable battery is not charged (the voltage of the rechargeable battery does not change), while in case (iii), the rechargeable battery is discharged to reduce its voltage.

If the state of case (i) continues, the rechargeable battery ultimately becomes overcharged. If the overcharge state further continues, it causes heat generation and fluid leakage of the rechargeable battery, thereby shortening its life. Accordingly, for avoiding the overcharge state, it may be required to vary the amount of electric power supplied by the power supply unit so as to satisfy the relation of case (ii) or (iii) during the operation of the liquid vibration motor.

In order to vary (reduce) the amount of supplied electric power during the operation of the linear vibration motor, it can be considered to change continuous power supply to intermittent power supply. However, such change causes the rechargeable battery voltage to increase as compared with that before the supply. Then, the current flowing through the winding increases as compared with that before the supply, and thus the magnetic thrust generated thereby increases, thereby increasing the amplitude displacement of the vibrator 102.

While, the control output unit 105 controls and stabilizes the amplitude of the vibrator 102, so that it adjusts a subsequent drive output in an attempt to reduce the increased amplitude to a predetermined value. Then, it may occur that the control output unit 105 excessively reduces the amplitude of the vibrator 102. When the increase of amplitude displacement and the excessive amplitude reduction of the vibrator 102 are repeated, it causes amplitude fluctuations, which make a whirring noise.

SUMMARY OF THE INVENTION

An object of the present invention is to provide a linear vibration motor which does not make amplitude fluctuations and whirring noise, even when electric power is intermittently supplied.

This object is achieved according to the present invention by a linear vibration motor comprising: a stator provided with one of a permanent magnet and an electromagnet including a winding; a vibrator provided with the other of the permanent magnet and the electromagnet and supported to be able to vibrate; a movement detection unit for detecting movement of the vibrator; a control output unit for supplying electric power to the winding of the electromagnet based on an output of the movement detection unit so as to generate vibration of the vibrator; a rechargeable battery for supplying electric power to the control output unit; and a power supply unit for supplying electric power to the control output unit and to the rechargeable battery, wherein the power supply unit supplies electric power in an intermittent mode with synchronized timing such that the timing of the intermittent power supply is synchronized with the timing of the power supply to the winding.

According to this linear vibration motor, the voltages of the rechargeable battery for left and right outputs to the winding become the same as each other at the timing of supplying electric power to the winding for left and right outputs, whereby amplitude variation caused by difference between the voltages of the rechargeable battery can be prevented.

The linear vibration motor according to the present invention can be arranged such that the movement detection unit detects amplitude of the vibrator, and that according to the amplitude of the vibrator detected by the movement detection unit, the power supply unit varies amount of electric power supplied therefrom.

The linear vibration motor can be further arranged such that according to voltage of the rechargeable battery, the power supply unit varies amount of electric power supplied therefrom, or such that according to temperature of the rechargeable battery and/or the power supply unit, the power supply unit varies amount of electric power supplied therefrom.

Furthermore, the linear vibration motor can be arranged such that the power supply unit varies amount of electric power supplied therefrom by varying pulse width of output therefrom, or such that the power supply unit varies amount of electric power supplied therefrom by varying voltage amplitude of pulses output therefrom.

It is preferable that the power supply unit supplies a current the same as no-load current of the linear vibration motor.

Furthermore, the linear vibration motor can be arranged such that the power supply unit supplies electric power at a frequency of timing which is even multiple of the frequency of timing for supplying electric power to the winding.

According to the present invention, even when electric power is supplied to the rechargeable battery in an intermittent mode, the voltage of the rechargeable battery does not vary at the time of supplying electric power to the winding. Accordingly, amplitude fluctuations of the vibrator attributed to the rechargeable battery do not occur, thereby preventing whirring noise generation.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein:

FIG. 3A is a timing chart for explaining a further example of the operation of the linear vibrator motor;

DESCRIPTION OF THE PREFERRED EMBODIMENTS

The best modes and preferred embodiments of the present invention will be described hereinafter with reference to the annexed drawings. The specific embodiments described are not intended to cover the entire scope of the present invention, and hence the present invention is not limited to only the specific embodiments.

Figure 1:
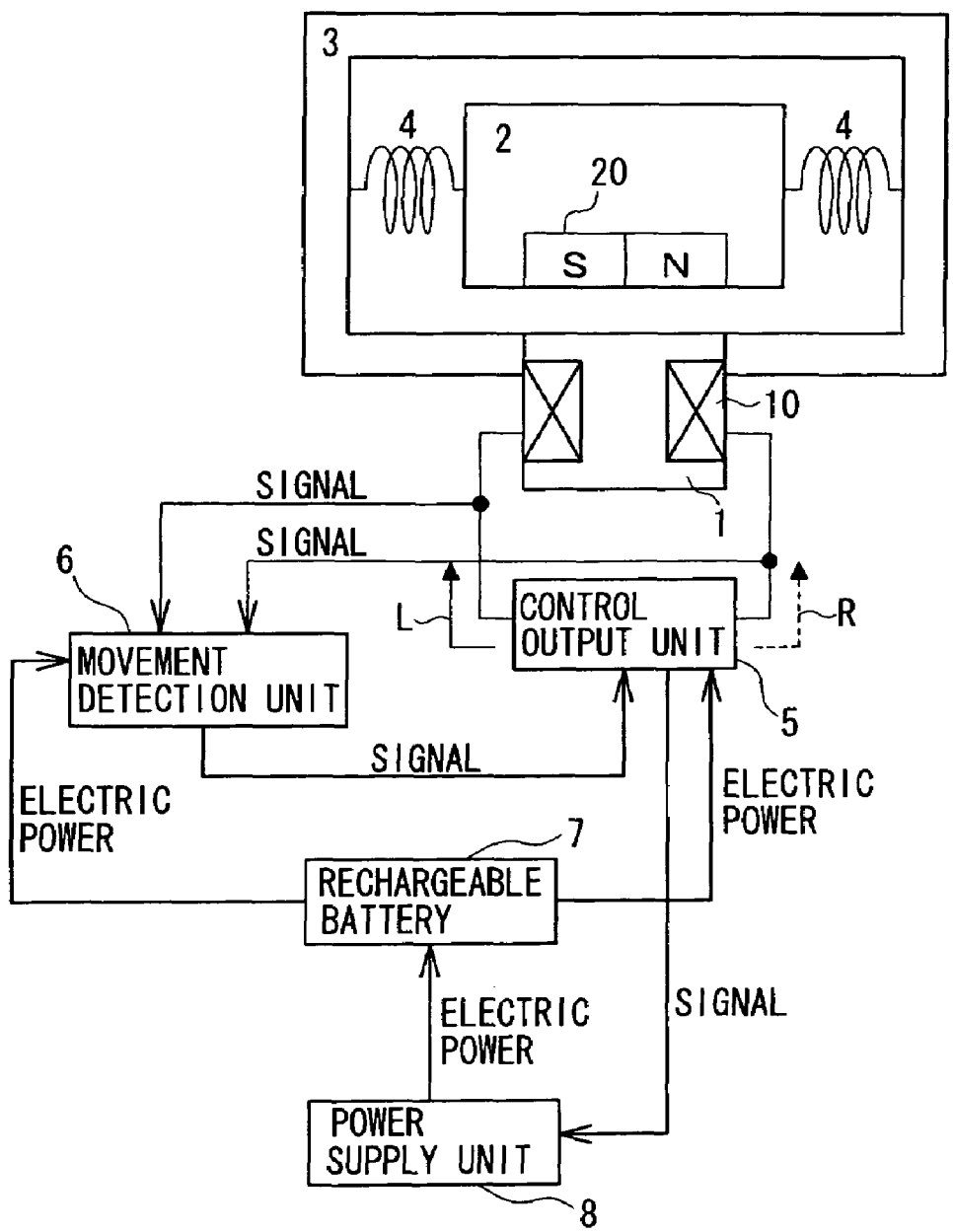
FIG. 1 is a schematic circuit diagram, in block form, of a linear vibration motor according to an embodiment of the present invention.

FIG. 1 shows a circuit diagram of the basic structure of a linear vibration motor according to an embodiment of the present invention. As shown in FIG. 1, the linear vibration motor comprises: a stator 1 provided with a winding 10 for forming an electromagnet; a vibrator 2 provided with a permanent magnet 20; a frame 3 for holding the vibrator 2; springs 4 connected between the frame 3 and the vibrator 2 for suspending the vibrator 2 so that the vibrator 2 is supported to be able to vibrate; a control output unit 5 for supplying a drive current to the winding 10; and a movement detection unit 6 for detecting the movement of the vibrator 2 on the basis of the electromotive force generated in the winding 10. The linear vibration motor further comprises: a rechargeable battery 7 for supplying electric power to the control output unit 5; and a power supply unit 8 for supplying electric power to the control output unit 5 and to the rechargeable battery 7. Based on the output of the movement detection unit 6, the control output unit 5 controls, by e.g. PWM (pulse width modulation) control, a drive current (electric power) to be supplied to the winding 10 so as to generate reciprocating vibration of the vibrator 2 at a frequency near the natural frequency of the spring vibrating system consisting of the spring 4 and the vibrator 2.

The movement detection unit 6 can be one that detects at least one of displacement, velocity and acceleration. Based on the detection, the control output unit 5 controls the drive current to be supplied to the winding 10 so as to make the amplitude of the vibrator 2 constant. Since such control is known as disclosed in e.g. the above described Japanese Laid-open Patent Publication 2001-16892, a detailed description is omitted here. In FIG. 1, the stator 1 is provided with the permanent magnet (winding 10), while the vibrator 2 is provided with the permanent magnet 20. However, they can be swapped with each other as long as the stator 1 is provided with one of a permanent magnet and an electromagnet, while the vibrator 2 is provided with the other of the permanent magnet and the electromagnet.

Figure 2:
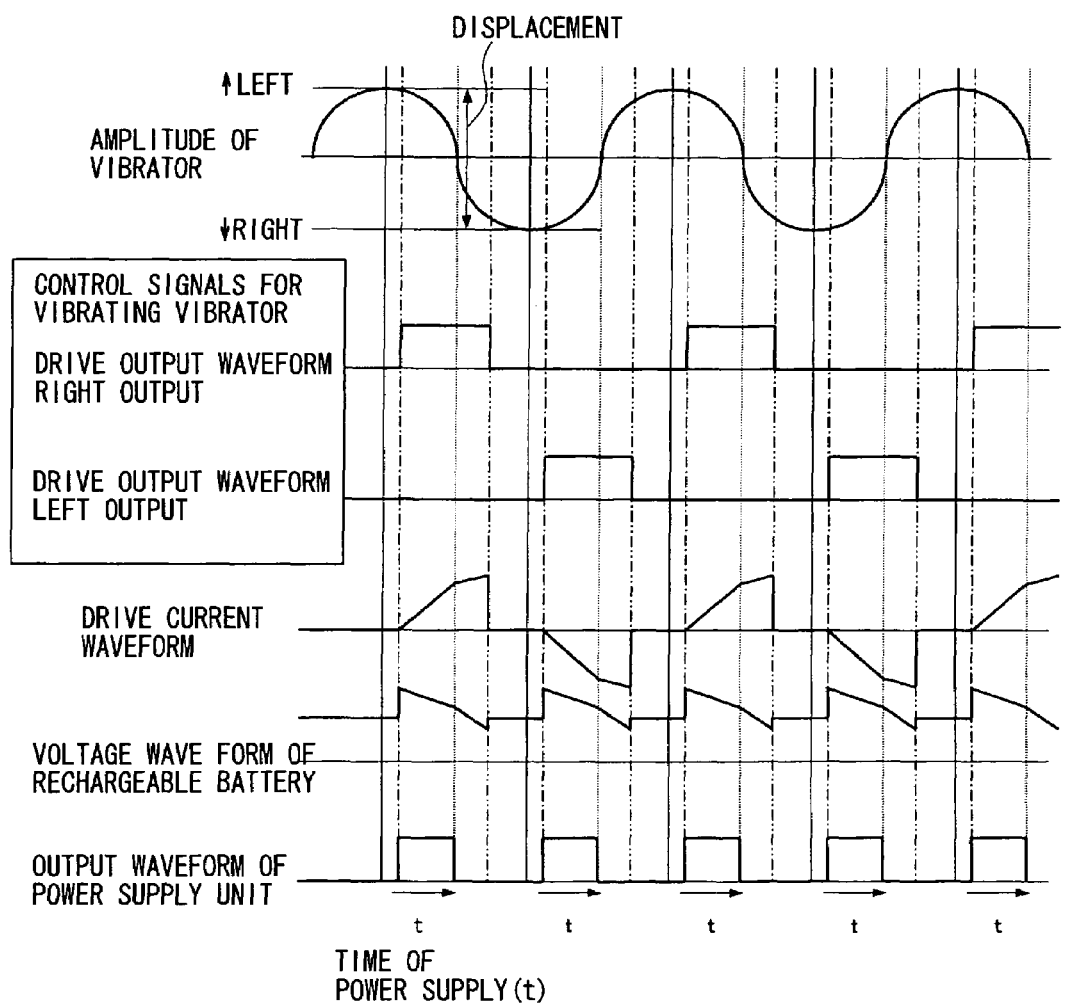
FIG. 2 is a timing chart for explaining an example of the operation of the linear vibrator motor.

A feature of the present invention is that the control output unit 5 includes a timing controller (not shown in FIG. 1) such that when the power supply unit 8 for supplying electric power from an AC power source supplies electric power intermittently, the timing controller adjusts the timing of the electric power supply to the timing at which the control output unit 5 allows a drive current to flow therefrom into the winding 10 as shown in FIG. 2. FIG. 2 shows, from top to bottom: amplitude of the vibrator 2; control signals for vibrating the vibrator 2 (left and right drive outputs as also indicated by solid arrow L and dashed arrow R in FIG. 1); drive current waveform; voltage waveform of rechargeable battery 7; and output waveform of power supply unit 8.

In other words, the power supply unit 8 supplies electric power in an intermittent mode with synchronized timing such that the timing of the intermittent power supply is synchronized with the timing of the power supply to the winding 10 (in one-to-one synchronization). More specifically, the control output unit 5 controls the power supply unit 8 to supply the electric power in the intermittent mode. This adjustment of the timing of electric power supply to the timing of drive current flow makes it possible to allow the voltages (voltage waveforms) of the rechargeable battery 7 for left and right outputs to the winding 10, respectively, to be the same as each other at the timing when left and right control signals (electric power) for vibrating the vibrator 2 (left and right drive outputs as also indicated by solid arrow L and dashed arrow R in FIG. 1) are output or supplied from the control output unit 5, respectively. This causes the amounts of electric power (amounts of energy) supplied to the winding 10 for the left and right outputs, respectively, to be the same as each other, whereby the amplitudes of the vibrator 2 with the left and right outputs become the same as each other at the timing when the left and right control signals for vibrating the vibrator 2 are output from the control output unit 5, respectively. This prevents the linear vibration motor according to the present embodiment from making whirring noise due to the amplitude fluctuations.

The time t (pulse width) of the power supply from the power supply unit 5 is determined so as to prevent overcharging of the rechargeable battery 7. The time t is preferably selected to make it possible for the power supply unit 8 to supply a current the same as the no-load current of the linear vibration motor, thereby preventing overcharging of the rechargeable battery 7 even during continuous operation of the linear vibration motor under no-load condition.

Figure 3B:
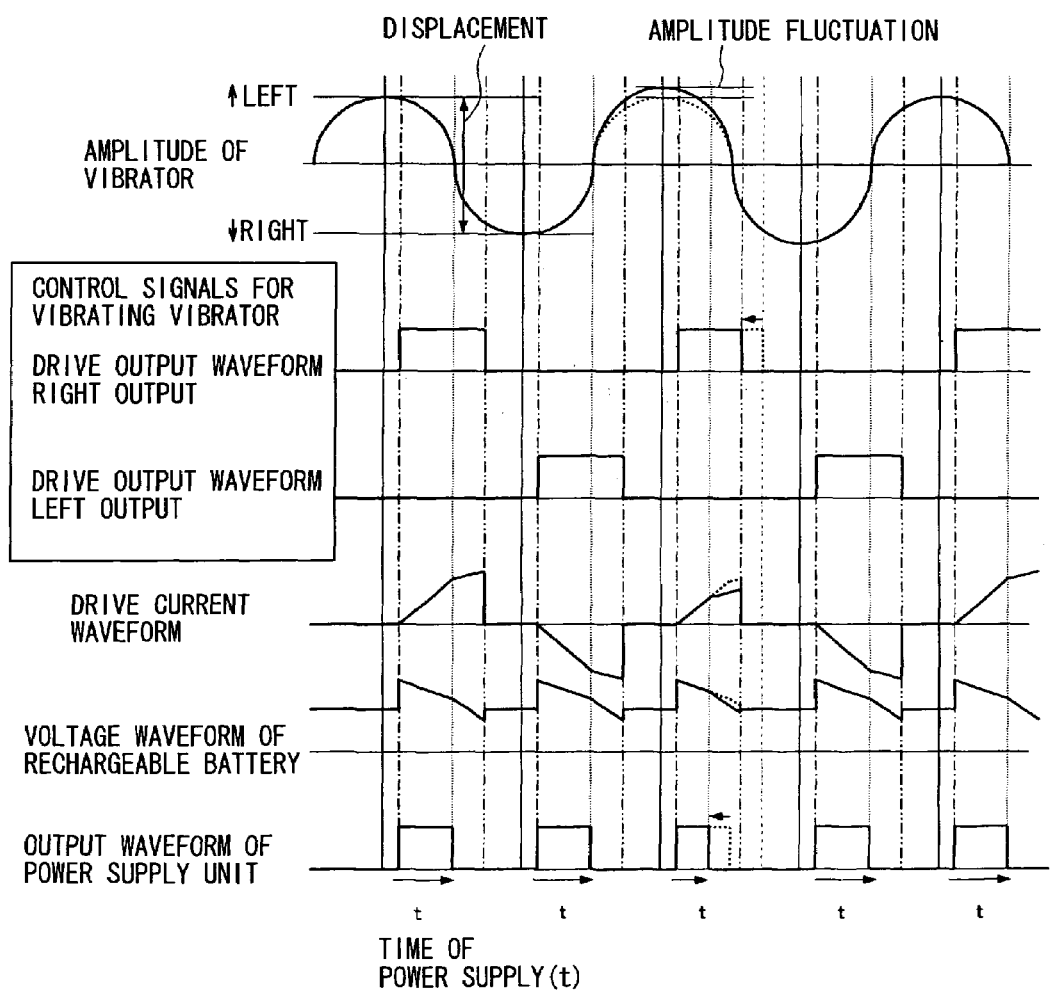
FIG. 3B is a timing chart for explaining a still further example of the operation of the linear vibrator motor.

When the amplitude of the vibrator 2 varies with a load fluctuation, it is preferable to vary the amount of electric power, supplied from the power supply unit 8, according to the amplitude (amplitude value) of the vibrator 2. More specifically, when the amplitude of the vibrator 2 varies, the amplitude is stabilized such that when the amount of amplitude displacement decreases, the pulse width of the drive output is increased as shown in FIG. 3A, while when the amount of amplitude displacement increases, the pulse width of the drive output is reduced as shown in FIG. 3B. Each of FIG. 3A and FIG. 3B shows, from top to bottom: amplitude of the vibrator 2; control signals for vibrating the vibrator 2 (left and right drive outputs as also indicated by solid arrow L and dashed arrow R in FIG. 1); drive current waveform; voltage waveform of rechargeable battery 7; and output waveform of power supply unit 8. The preferable variation of the amount of supplied electric power according to the variation or displacement of the amplitude, as described above, is such that when the pulse width of the drive output increases, the amount of electric supply from the power supply unit 8 is increased, while when the pulse width of the drive output decreases, the amount of electric supply from the power supply unit 8 is decreased.

If a constant amount of electric power were continuously supplied even when the amplitude displacement increases, the following sequence of causes and consequences would be brought about: the pulse width of the drive output decreases due to the above described amplitude stabilization; this causes the drive current to decrease; this causes the current flowing into the rechargeable battery to increase; and this causes the voltage of the rechargeable battery to fluctuate. If a constant amount of electric power were continuously supplied even when the amplitude displacement decreases, as opposed to increase, the following sequence of causes and consequences would be brought about: the pulse width of the drive output increases due to the above described amplitude stabilization; this causes the drive current to increase; this causes the current flowing out of the rechargeable battery to decrease; and this causes the voltage of the rechargeable battery to fluctuate. However, since the amount of supplied electric power is varied according to the pulse width of the drive output as described above in the present embodiment, the voltage fluctuation of the rechargeable battery can be reduced, whereby the fluctuation of the amplitude displacement caused by the voltage fluctuation of the rechargeable battery can be minimized.

Figure 4:
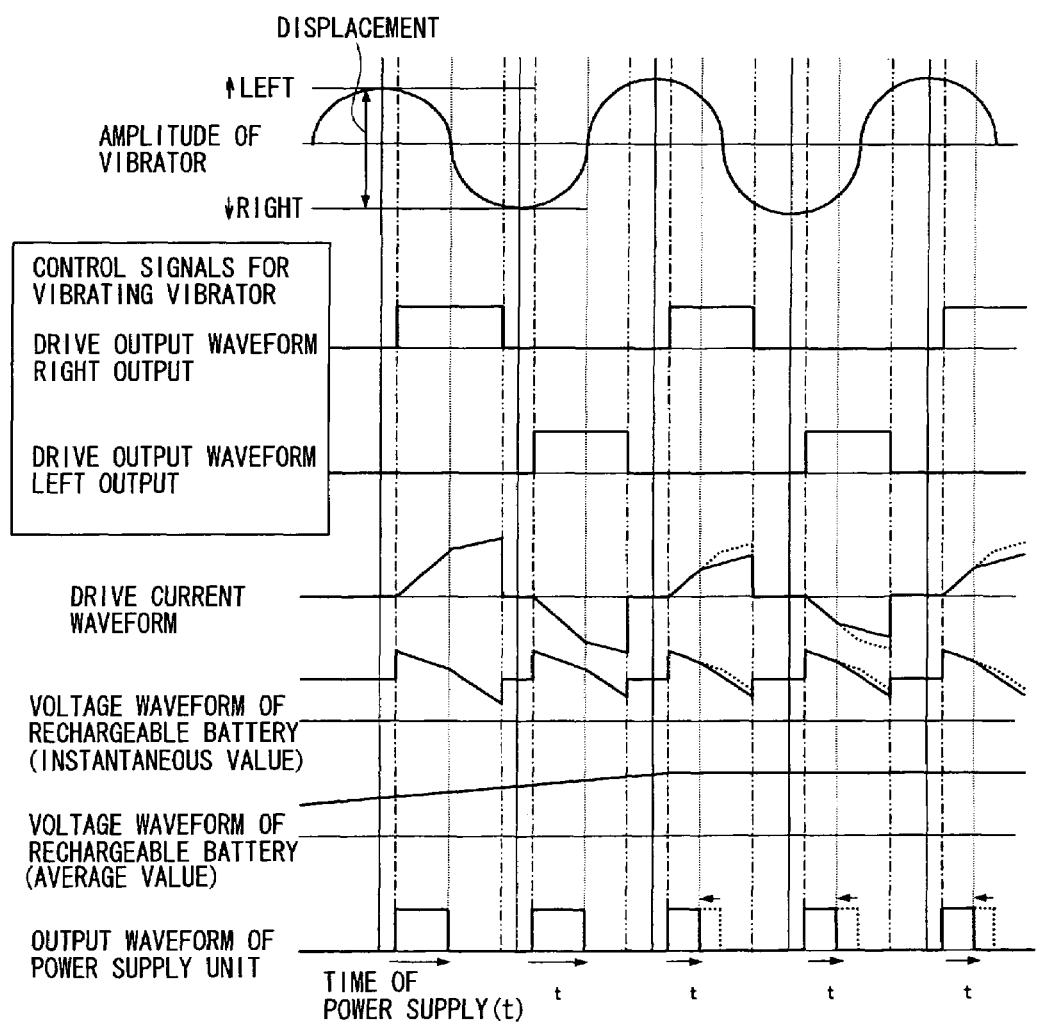
FIG. 4 is a timing chart for explaining a yet further example of the operation of the linear vibrator motor.
Figure 5:
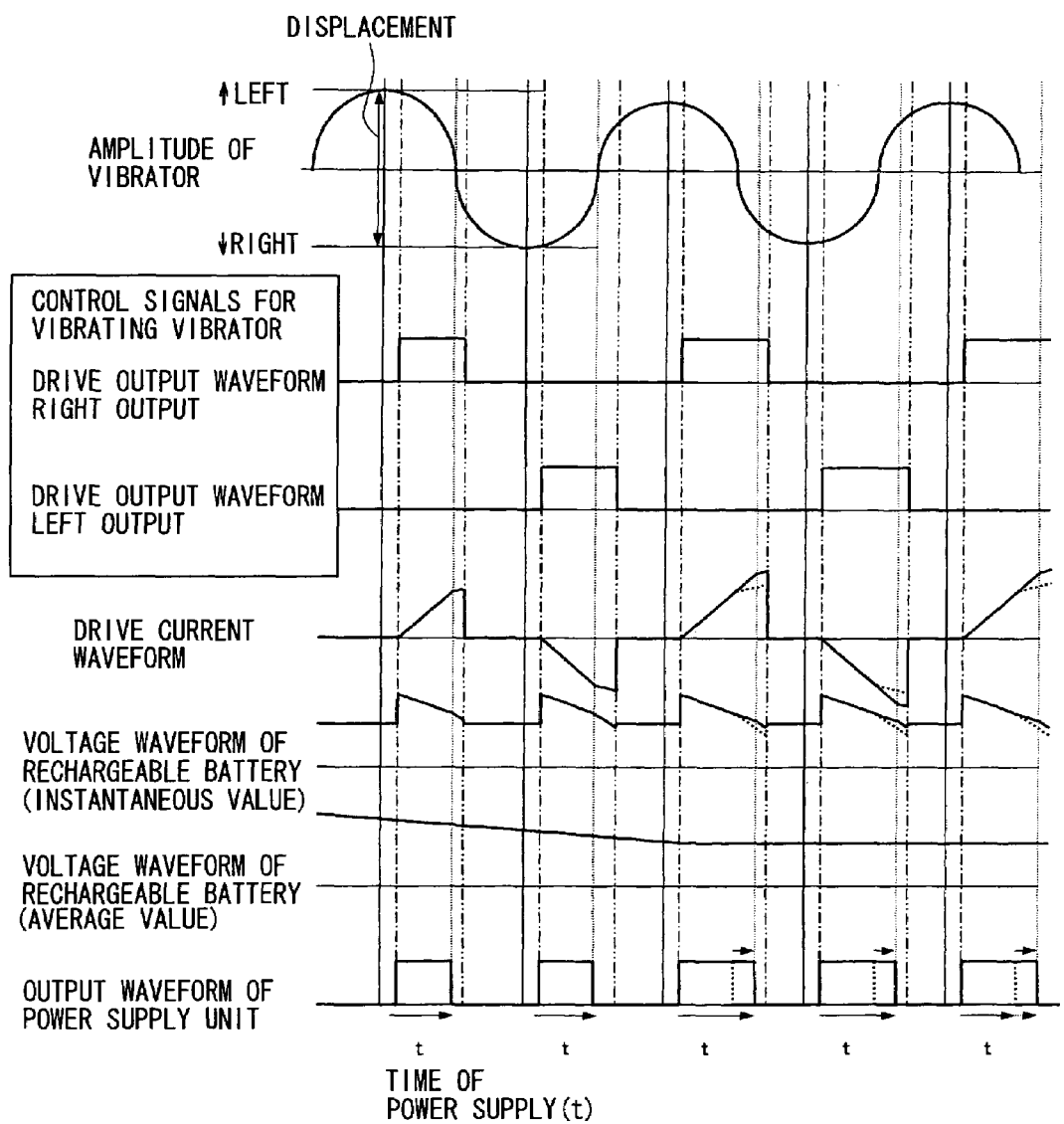
FIG. 5 is a timing chart for explaining another example of the operation of the linear vibrator motor.

It is further preferable to vary the amount of electric power, supplied from the power supply unit 8, according to the voltage of the rechargeable battery 7. More specifically, when the voltage of the rechargeable battery 7 increases, the amplitude of the vibrator 2 increases so that the pulse width of the drive output is reduced due to the above described amplitude stabilization, while when the voltage of the rechargeable battery 7 decreases, the amplitude of the vibrator 2 decreases so that the pulse width of the drive output is increased due to the above described amplitude stabilization The further preferable variation of the amount of supplied electric power, as described above, is such that when the voltage of the rechargeable battery 7 increases, the amount of electric supply from the power supply unit 8 is reduced as shown in FIG. 4, while when the voltage of the rechargeable battery 7 decreases, the amount of electric supply from the power supply unit 8 is increased as shown in FIG. 5. Each of FIG. 4 and FIG. 5 shows, from top to bottom: amplitude of the vibrator 2; control signals for vibrating the vibrator 2 (left and right drive outputs as also indicated by solid arrow L and dashed arrow R in FIG. 1); drive current waveform; voltage waveform of rechargeable battery 7 (instantaneous value); voltage waveform of rechargeable battery 7 (average value); and output waveform of power supply unit 8. Note that the voltage of the rechargeable battery 7 can be smoothed by e.g. an integrator circuit to obtain its average value, which is to be fed back to the control output unit 5.

If a constant amount of electric power were continuously supplied in the intermittent power supply mode even when the voltage of the rechargeable battery increases, the following sequence of causes and consequences would be brought about: the pulse displacement increases; this causes the pulse width of the drive output to decrease due to the above described amplitude stabilization; this causes the drive current to decrease; this causes the current flowing into the rechargeable battery to increase; and this causes the voltage of the rechargeable battery to further increase. If a constant amount of electric power were continuously supplied even when the voltage of the rechargeable battery decreases, as opposed to increase, the following sequence of causes and consequences would be brought about: the amplitude displacement decreases; this causes the pulse width of the drive output to increase due to the above described amplitude stabilization; this causes the drive current to increase; this causes the current flowing out of the rechargeable battery to decrease; and this causes the voltage of the rechargeable battery to further decrease. However, since the amount of supplied electric power is varied according to the voltage of the rechargeable battery as described above in the present embodiment, the voltage fluctuation of the rechargeable battery can be reduced, and furthermore the fluctuation of the amplitude displacement can be minimized. Note that FIG. 4 shows the case where the voltage of the rechargeable battery increases, while FIG. 5 shows the case where the voltage of the rechargeable battery decreases.

Figure 6:
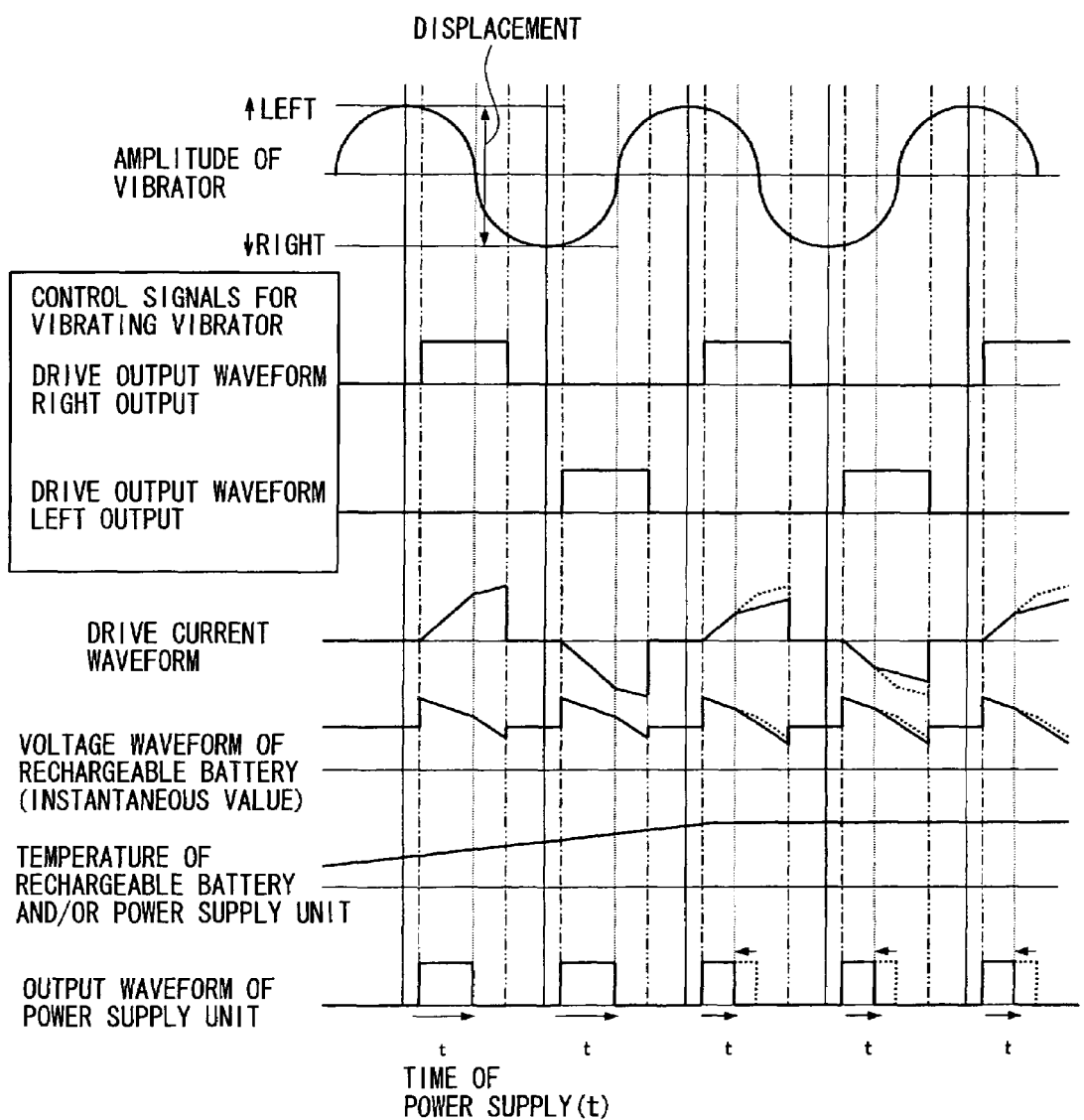
FIG. 6 is a timing chart for explaining still another example of the operation of the linear vibrator motor.

When the temperature of the rechargeable battery 7 and/or the power supply unit 8 increases, it is preferable to reduce the amount of electric power supplied from the power supply unit 8 as shown in FIG. 6. In order to carry out the above operation, a temperature sensor is equipped on the rechargeable battery 7 and/or the power supply unit 8, and detected temperature signal is given to the control output unit 5. FIG. 6 shows, from top to bottom: amplitude of the vibrator 2; control signals for vibrating the vibrator 2 (left and right drive outputs as also indicated by solid arrow L and dashed arrow R in FIG. 1); drive current waveform; voltage waveform of rechargeable battery 7 (instantaneous value); temperature of the rechargeable battery 7 and/or the power supply unit 8; and output waveform of power supply unit 8. This makes it possible to reduce the temperature rise of the rechargeable battery 7 and/or the power supply unit 8.

For the rechargeable battery 7, in particular, the reduction of the amount of supplied electric power in response to temperature rise is effective for avoiding overcharging of the rechargeable battery 7 as well, because the temperature of the rechargeable battery 7 abruptly increases when overcharged. Further, since, as opposed to cut-off of the power supply, the power supply unit 8 continues to supply electric power although the supply amount is reduced, the voltage of the rechargeable battery 7 is prevented from decreasing abruptly. For this reason as well, the fluctuation of the amplitude displacement of the vibrator 2 to be caused by the voltage fluctuation of the rechargeable battery 7 can be reduced, thereby stabilizing the operation of the linear vibration motor.

Figure 7:
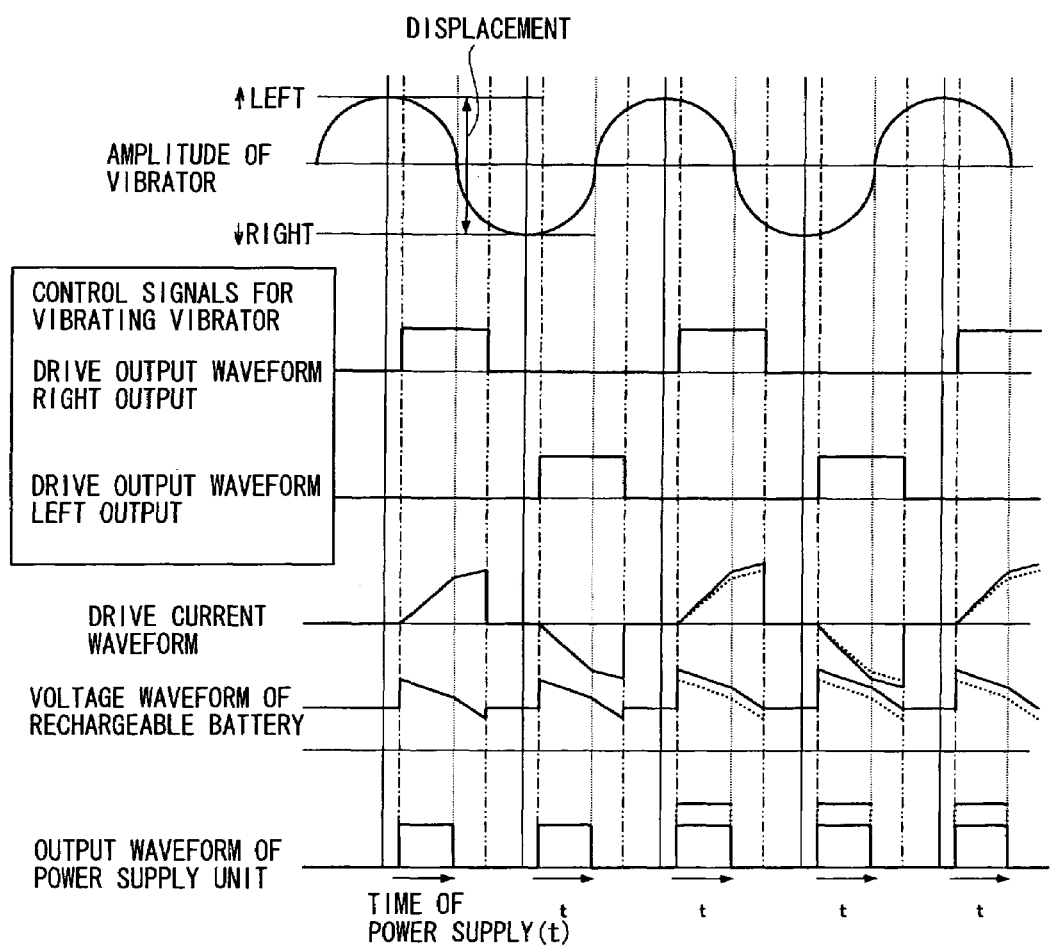
FIG. 7 is a timing chart for explaining yet another example of the operation of the linear vibrator motor.

It is to be noted that the present invention is not limited to the structures or configurations as embodied above, and various modifications are possible. For example, in the above embodiments, the amount of supplied electric power is varied using PWM control, which varies the pulse width of the output (time t of the power supply) from the power supply unit 8. However, instead, the amount of supplied electric power can be varied using PAM (pulse amplitude modulation) control which varies the voltage amplitude of the pulses of the output from the power supply unit 8 as shown in FIG. 7 showing, from top to bottom, the same factors as those in FIG. 2.

Figure 8:
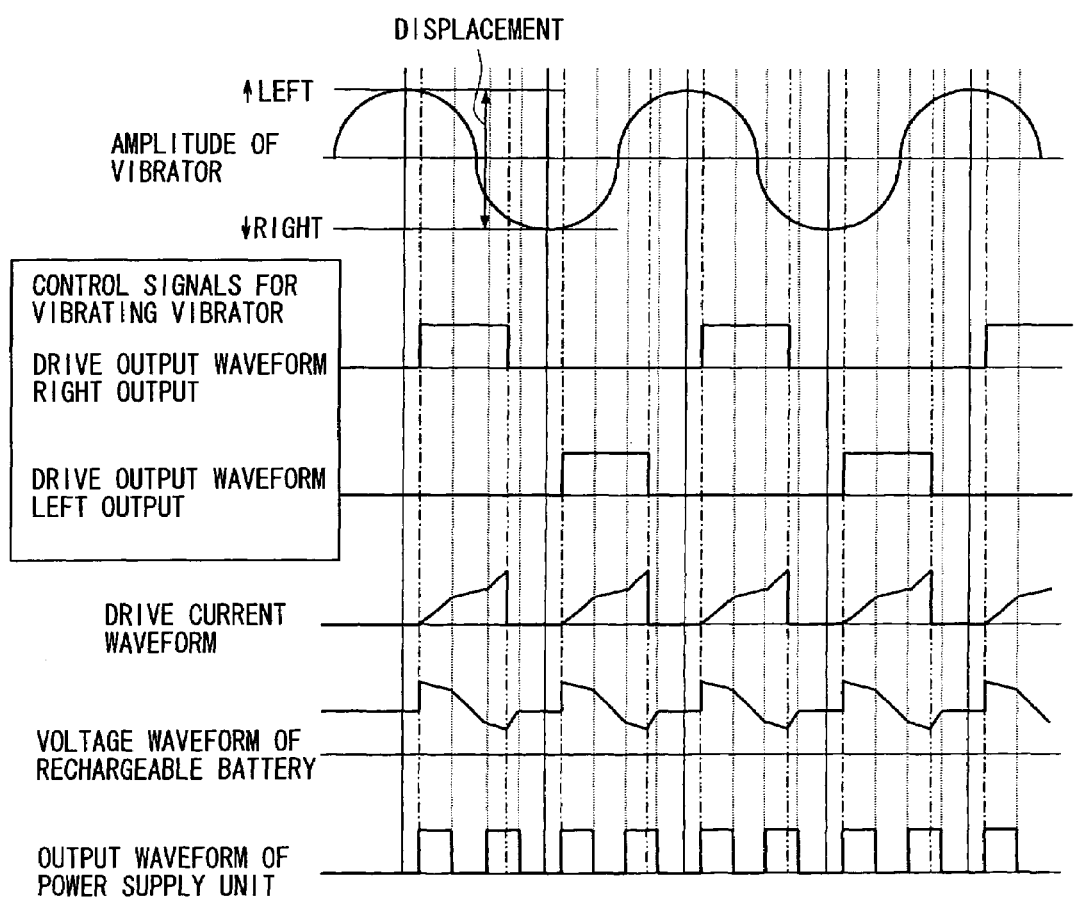
FIG. 8 is a timing chart for explaining a further different example of the operation of the linear vibrator motor.
Figure 9:
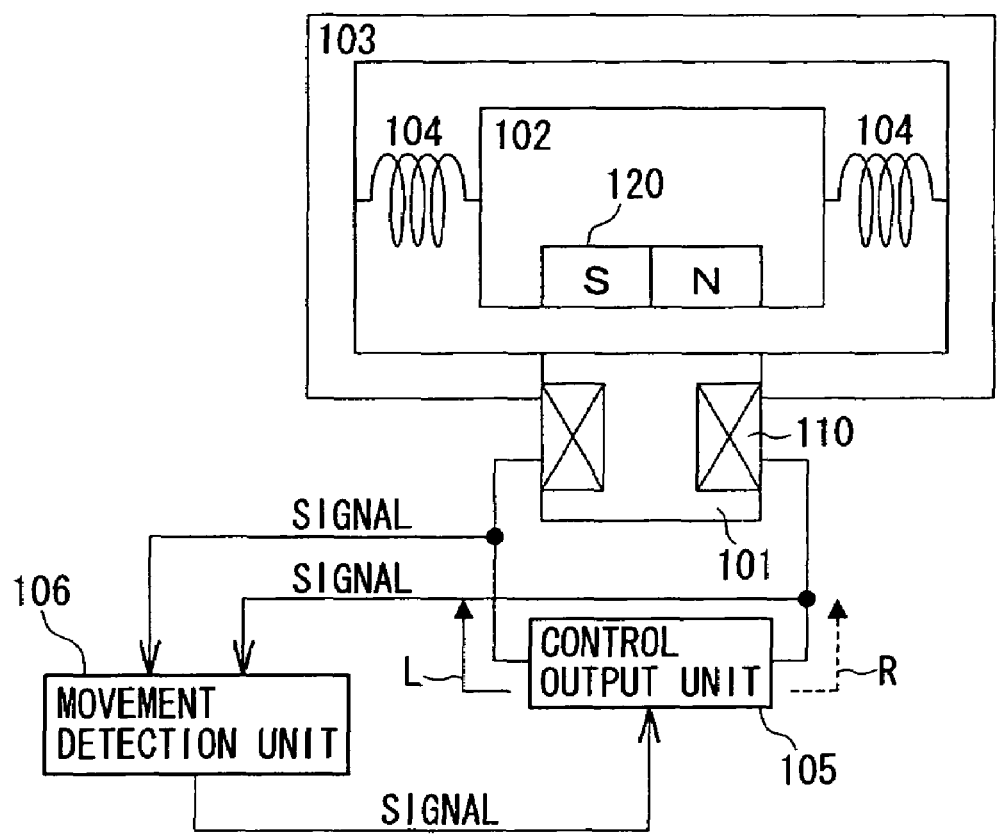
FIG. 9 is a schematic circuit diagram, in block form, of a linear vibration motor according to the prior art.

Furthermore, in the above embodiments, the timing of the drive output is synchronized with the timing of the power supply in one-to-one synchronization. However, instead, it is possible for the power supply unit 8 to supply the intermittent electric power at a frequency of timing which is even multiple of the frequency of timing of the drive output (for supplying electric power to the winding 10) as shown in FIG. 8 showing, from top to bottom, the same factors as those in FIG. 2. This also makes it possible to prevent the whirring noise generation.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

What is claimed is:

1. A linear vibration motor comprising:
   a stator provided with one of a permanent magnet and an electromagnet including a winding;
   a vibrator provided with the other of the permanent magnet and the electromagnet and supported to be able to vibrate;
   a movement detector for detecting movement of the vibrator;
   an output controller for supplying electric power to the winding of the electromagnet based on an output of the movement detector so as to generate vibration of the vibrator;
   a rechargeable battery for supplying electric power to the output controller; and
   a power supply for supplying electric power to the output controller and to the rechargeable battery,
   wherein the power supply supplies electric power in an intermittent mode with synchronized timing such that the timing of the intermittent power supply is synchronized with the timing of the power supply to the winding.

2. The linear vibration motor according to claim 1,
   wherein the output controller controls the power supply to supply the electric power in the intermittent mode with the synchronized timing.

3. The linear vibration motor according to claim 2,
   wherein the movement detector detects an amplitude of the vibrator, and
   wherein based upon the amplitude of the vibrator detected by the movement detector, the output controller controls the power supply to vary an amount of electric power supplied from the power supply.

4. The linear vibration motor according to claim 3,
   wherein based upon the voltage of the rechargeable battery, the output controller controls the power supply to vary an amount of electric power supplied from the power supply.

5. The linear vibration motor according to claim 3,
   wherein based upon a temperature of the rechargeable battery and/or the power supply, the output controller controls the power supply to vary an amount of electric power supplied from the power supply.

6. The linear vibration motor according to claim 3,
   wherein the power supply varies an amount of electric power supplied therefrom by varying a pulse width of an output of the power supply.

7. The linear vibration motor according to claim 3,
   wherein the power supply varies an amount of electric power supplied therefrom by varying a voltage amplitude of pulses output therefrom.

8. The linear vibration motor according to claim 3,
   wherein the power supply supplies a current the same as a no-load current of the linear vibration motor.

9. The linear vibration motor according to claim 3,
   wherein the power supply supplies electric power at a timing frequency which is an even multiple of a timing frequency for supplying electric power to the winding.

10. A vibration motor controller, the motor including a stator and a vibrator, one of the stator and the vibrator provided with a permanent magnet and the other of the stator and the vibrator provided with an electromagnet including a winding, the vibration motor controller comprising:
    a movement detector configured to detect movement of the vibrator;
    an output controller configured to supply electrical power to the winding of the electromagnet based on an output of the movement detector, so as to generate a vibration of the vibrator;
    a rechargeable battery configured to supply electrical power to the output controller; and
    a power supply configured to supply electrical power to the output controller and to the rechargeable battery,
    wherein the power supply intermittently supplies electrical power, such that a timing of the intermittent power supply is synchronized with a timing of power supply to the winding.

11. The vibration motor controller according to claim 10, the output controller being configured to control the power supply to intermittently control electrical power with synchronized timing.

12. The vibration motor controller according to claim 11, the movement detector being configured to detect an amplitude of the vibrator, and in accordance with the detected amplitude of the vibrator, the output controller controls the power supply to vary an amount of electrical power supplied from the power supply.

13. The vibration motor controller according to claim 12, wherein the output controller controls the power supply to vary an amount of electric power supplied from the power supply in accordance with a voltage of the rechargeable battery.

14. The motor controller according to claim 12, the output controller being configured to control the power supply to vary the amount of electrical power supplied from the power supply in accordance with a temperature of one of the rechargeable battery and the power supply.

15. The motor controller, according to claim 12, the power supply being configured to vary an amount of electrical power supplied from the power supply, by varying a pulse of the power supply output.

16. The motor controller according to claim 12, the power supply being configured to vary the amount of electrical power supplied by the power supply, by varying an amplitude of voltage pulses output by the power supply.

17. The motor controller according to claim 12, the power supply being configured to supply a current that is the same as a no-load current of the motor.

18. The motor controller according to claim 12, the power supply being configured to supply electrical power at a timing frequency which is an even multiple of the timing frequency for supplying electrical power to the winding of the motor.

* * * * *